TYPEWRITER RECEIVER MEANS

Filed June 7, 1967 5 Sheets-Sheet 1

INVENTORS
YUKINAO SHIDA
MUNEYOSHI NAGATA
BY
OSTROLENK, FABER, GERB & SOFFEN
ATTORNEYS

July 15, 1969 YUKINAO SHIDA ET AL 3,455,428

TYPEWRITER RECEIVER MEANS

Filed June 7, 1967 5 Sheets-Sheet 2

INVENTORS
YUKINAO SHIDA
MUNEYOSHI NAGATA
BY
OSTROLENK, FABER, GERB & SOFFEN
ATTORNEYS

INVENTORS
YUKINAO SHIDA
MUNEYOSHI NAGATA

BY

OSTROLENK, FABER, GERB & SOFFEN
ATTORNEYS

| LEVELS | CODE | | | CONTROL LEVERS LIFTED | | | | | |
|---|---|---|---|---|---|---|---|---|---|
| I | 0 | 0 | 0 | N | O | N | E | | |
| II | 1 | 0 | 0 | 40 | | 42 | | 44 | |
| III | 0 | 1 | 0 | 40 | 41 | | | 44 | |
| IV | 1 | 1 | 0 | 40 | 41 | 42 | | 44 | |
| V | 0 | 0 | 1 | 40 | 41 | 42 | 43 | | |
| VI | 1 | 0 | 1 | 40 | 41 | 42 | 43 | 44 | |
| VII | 0 | 1 | 1 | 40 | 41 | 42 | 43 | 44 | 39 |

INVENTORS
YUKINAO SHIDA
MUNEYOSHI NAGATA
BY
OSTROLENK, FABER, GERB & SOFFEN
ATTORNEYS

INVENTORS
YUKINAO SHIDA
MUNEYOSHI NAGATA
BY
Ostrolenk, Faber, Gerb & Soffen
ATTORNEYS United States Patent Office 3,455,428
Patented July 15, 1969

3,455,428
TYPEWRITER RECEIVER MEANS

Yukinao Shida and Muneyoshi Nagata, Tokyo, Japan, assignors to Nippon Electric Company Limited, Tokyo, Japan Filed June 7, 1967, Ser. No. 644,396
Int. Cl. B41j 1/46
U.S. Cl. 197—55 10 Claims

ABSTRACT OF THE DISCLOSURE

This invention teaches a novel type-wheel assembly wherein a type-wheel of substantially cylindrical configuration is employed, and has a capacity of accommodating as many as ninety-six characters which are arranged in a very compact fashion so as to minimize overall size and mass of the type-wheel in order to enable it to move rapidly to both its typing and rest positions.

The characters provided on the type-wheel may, for example, be of two different languages wherein characters of any given level around the type-wheel, instead of using the conventional arrangement of providing only characters of one language per level, are interspersed so that alternate characters are of a first language and the interspersed characters are of a second language.

The code combinations are divided into two code groups one of which selects the particular angular position which the type-wheel is to assume for the printing operation, and the second code group of which automatically selects the particular level in which the character to be typed is positioned.

The type-wheel drive assembly is comprised of a plurality of code bars arranged to be normally in a rest position and to be lifted by a predetermined distance in the presence of a Mark or binary ONE code bit so as to lift an associated slide member, each of which is provided with an elongated slot therethrough.

The type-wheel assembly is comprised of the type-wheel which is connected to a vertical drive lever moving the type-wheel into the printing position. The type-wheel assembly is further provided with an operating arm which is confronted by at least one blocking lever which is moved into the path of movement of the operating arm in order to positively select the level to which the type-wheel is driven. All of the blocking levers are rigidly coupled to an associated control lever, both of which pivots about a fixed shaft. All of the control levers pass through one or more of the slots provided within the slide members so as to be selectively lifted in order to selectively move their associated blocking levers from the operative position to the inoperative position.

The manner in which the control levers, and hence the blocking levers, are selectively moved to the inoperative position is controlled by selective vertical upward movement of the slide members, together with providing notches in the lower edges of the slots in each slide member, so as to lift certain of the control levers while allowing remaining ones of the control levers to remain stationary and in the operative position.

In economically arranging the ninety-six characters into six levels, the characters are first arranged into seven levels, and the remaining characters in the seventh level are then moved to unoccupied positions in one of the remaining six levels so as to reduce the number of levels around the type-wheel to six. However, the code combination for the seventh level remains, and this is fully accommodated for by providing an additional lever assembly which automatically selects the level of the type-wheel to which the characters previously occupying the seventh level have now been moved.

The instant invention relates to typing-receiver means, and more particularly means for use with teletypewriters or other motor operated typewriters of the class which employ type-wheels adapted for both rotational and axial vertical movement so as to selectively print characters, and which is designed to find increased character accommodating capacity, while at the same time providing compactness in size and increased operating speeds.

There are presently available a number of typing-receiver mechanisms capable of receiving coded signals from a remote location and converting these coded signals so as to employ them for automatically operating a typewriter mechanism. One category of the general class of such devices are those which have a type-wheel mechanism which is either substantially cylindrical or spherical in configuration, and is capable of accommodating sixty-four characters of alphabetic, numeric, or other type which are arranged in four levels or lines of sixteen characters each. Devices in this general category are well known and disclosed, for example, in the Japanese patent publication No. 22,387/1964.

Other problems presented by such mechanisms is the fact that Japan, as well as other countries of the world, employ many characters native to their country other than the alphabetic letters so that the maximum capacity of sixty-four characters is insufficient to include native letters such as, for example, "Kana" in Japan, as well as other symbols and characters which are selected and employed in a wide-spread manner in accordance with national customs and usage. There has thus been a great demand for a type-wheel mechanism capable of accommodating as much as ninety-six characters arranged at six levels about the type-wheel mechanism, each level being capable of accommodating sixteen characters.

The typing-receiver mechanism described in the above mentioned patent application is employed in thirty-two and thirty-three typewriter sets of the Teletype Corporation which use code arrangements of the binary coded or Mark-Space type, as will be described in more detail subsequently.

The encoded binary ONE, binary ZERO, or Mark and Space elements may be considered as being divided into two groups, wherein the first group of elements indentifies one of sixteen possible positions around the type-wheel, and wherein the second group of coded elements designates the axial position to which the type-wheel is to be moved in order to cause printing of the correct character.

In conventional arrangements, each level of characters is arranged about the type-wheel, typically in the order of figures, then letters, then figures, then letters, arranged in an alternating fashion. If it is desired to provide a type-wheel in which the figures and letters of a first language, say English, are to be interspersed, at different levels, with the interspersed figures and letters of a second language, say Japanese, so that alternating levels contain English characters and the interspersed levels contain Japanese characters, then it will be found that eight separate levels are required on the type-wheel. This makes the type-wheel rather bulky and of significant mass, which has a detrimental effect upon operating speeds.

The instant invention overcomes these disadvantages by providing a type-wheel of only six levels capable of accommodating a total of ninety-six characters, wherein the code groupings are designed so as to be further capable of performing the shift functions to shift between upper and lower levels.

The instant invention is comprised of a type-wheel of six levels wherein characters in foreign countries are interspersed, i.e., arranged in alternating fashion in each level, and wherein all the characters are arranged in a most economical fashion so as to provide a maximum capacity of ninety-six characters by providing all six levels with sixteen characters per level. The first group of coded elements are selected to identify the vertical position around the periphery of the type-wheel which the character to be printed occupies, thereby automatically selecting a vertically aligned group of characters of only one of the two languages provided on the type-wheel. The second group of coded characters is employed to select the level at which the particular character to be printed occupies by providing a signal to move the type-wheel in the axial direction in order to print this character.

The mechanism employed to control the amount of movement which the type-wheel undergoes in the axial direction is comprised of a plurality of pivotally mounted stop levers each having blocking arms arranged to selectively limit the amount of travel which a vertical drive lever may experience. The vertical drive lever is mechanically linked to the type-wheel assembly which is spring biased to move in a first direction when unlocked by a function key device. The type-wheel assembly will rise vertically (i.e., move in the first direction) limited only by the particular blocking lever positioned in the path of movement of the vertical drive lever. The blocking arm having the greatest length which is positioned in the path of movement of the vertical drive lever is that lever which determines the amount in which the type-wheel will move axially in the first direction.

Each of the blocking levers is provided with second arms, all of which arms are arranged to cooperate with one or more slide members normally biased in a first direction and capable of being lifted in a second direction opposite the first direction by means of a code bar arranged to cooperate with each of the slides. The code bars are designed to lift (i.e., move an associated slide in its first direction) against its associated biasing means in order to selectvely lift certain ones of the blocking levers so as to place one or more of the plurality of blocking arms into the path of movement of the vertical drive lever. Only five blocking levers are required to provide the capability of selecting any one of the six levels provided on the type-wheel when the characters of the two different languages provided on the drive wheel are arranged in conventional fashion and interspersed into one of the six levels having space to occupy additional characters. A sixth blocking lever is provided in order to automatically select the level which would normally be the seventh level, but which is now one of the six levels having adequate space to accommodate the characters of the seventh level so as to require only a maximum of six levels for the ninety-six character capacity of the type-wheel.

The code bars, once positioned in accordance with the bits representing the character levels, automatically position the slide members which, in turn, are provided with slot means to align selected ones of the blocking levers in the path of the vertical drive arm so as to very accurately and positively limit the vertical upward movement of the type-wheel, which is then returned to a rest position in readiness for a subsequent operation. The lightweight, compact design and the positive operation of the drive assembly are advantages not heretofore available in conventional apparatus.

It is, therefore, one object of the instant invention to provide a novel type-wheel assembly for use in typing-receiver mechanisms which is capable of providing automatic selection of a character type provided on a compactly designed type-wheel having a capacity of ninety-six characters.

Another object of the instant invention is to provide a novel type-wheel assembly for use in typing-receiver mechanisms, and the like, wherein the type-wheel assembly is designed to automatically select one character from a type-wheel having a capacity of ninety-six characters wherein characters of more than one language, for example, English and Japanese, may be selected.

Another object of the instant invention is to provide a novel type-wheel assembly for use in typing-receiver mechanisms, and the like, wherein a type-wheel having a capacity of ninety-six characters has the characters of more than one language provided in a very compact arrangement so as to limit the total number of levels of characters around the type-wheel, and further designed so as to intersperse characters of different languages within a single level.

Still another object of the instant invention is to provide a novel type-wheel assembly for use in typing-receiver mechanisms, and the like, wherein the type-wheel provides a very compact arrangement having a capacity of ninety-six characters arranged at different levels around the type-wheel such that the number of levels required about the type-wheel are kept to a minimum, and further comprising a level controlling mechanism in which coded information automatically operates the level controlling mechanism to positively and accurately control the level to which the type-wheel member is driven.

These and other objects of the instant invention will become apparent when reading the accompanying description and drawings in which.

Figure 5:
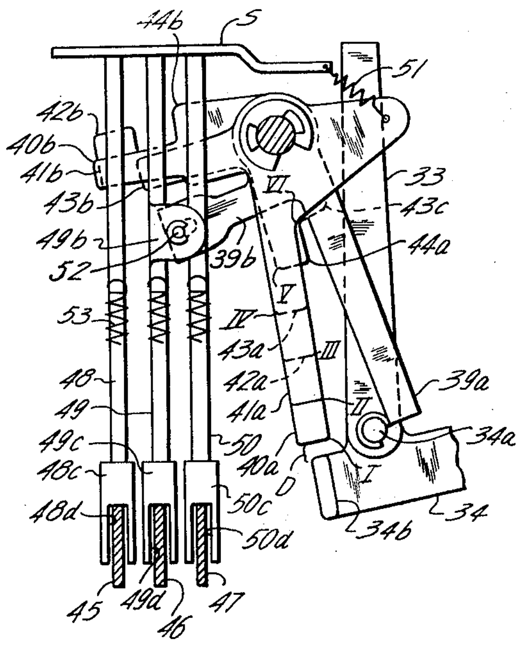
FIGURE 5 shows a fragmentary side elevational view of part of the mechanism of FIGURE 3, the assembly being shown on an enlarged scale.
Figures 5A, 5B:
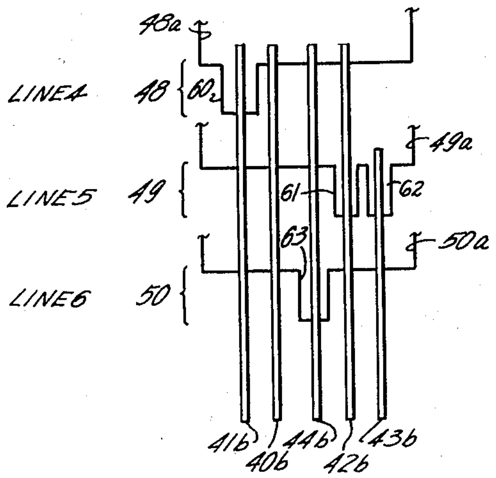

FIGURE 5*a* is a somewhat exploded view showing the lower edges of the slots of slide members 48 through 50 and the cooperating control levers **40*b* through 44*b*** in greater detail in order to explain the operation of the control and blocking levers.

FIGURE 5*b* is a chart showing the relationship between the levels of the type-wheel, the codes representing each level, and the levers listed under control of each of the code combinations.

Figure 6:
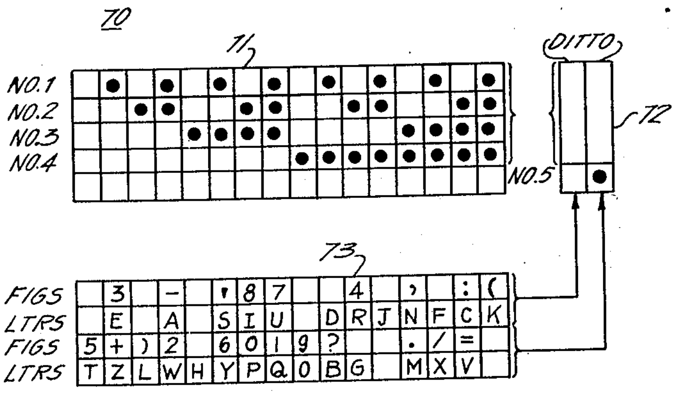
Figure 7:
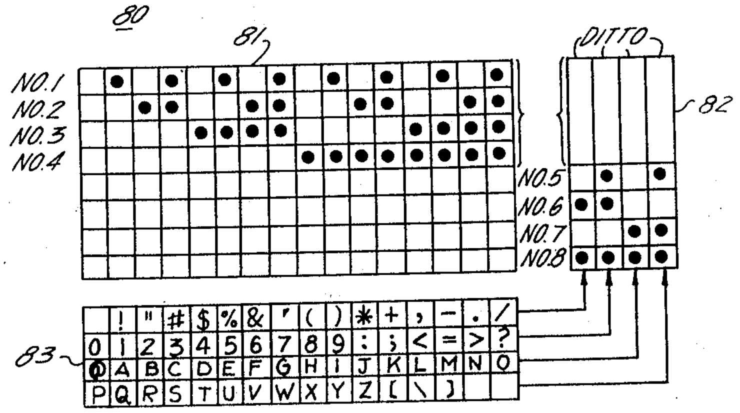

FIGURES 6 and 7 show conventional coding arrangements employed in teletypewriter sets which find widespread use throughout the United States.

Considering first FIGURE 6, there is shown therein a chart 70 having chart portions 71, 72 and 73. Chart portion 73 shows the characters around a type-wheel being arranged in four rows and sixteen columns. Any one of the sixteen columns is selected by the code combination shown in chart portion 71. For example, in order to select the right-handmost column, the code received must be Mark-Mark-Mark-Mark (i.e., binary 1 1 1 1). One additional code bit is employed to select the particular level or row to be printed. For example, with the selection of the right-handmost column, let it further be assumed that the letter K is to be printed. As shown by chart portion 72, the code bit will be Space (or binary ZERO). It can further be seen that a manual operation, i.e., the operation of a shift button to select either figures or letters must be depressed by the operator since the code bit Space is common to both the upper two rows containing figures and letters, respectively. In the like fashion, if the left-handmost column is to be selected, the code group is Space-Space-Space-Space (i.e., binary 0 0 0 0). Let it now be assumed that the figure 5 is to be printed. The fifth code bit is Mark (i.e., binary ONE), causing either one of the bottom two rows to be printed. A further manual operation selecting either figures or letters on the part of the operator must be performed to cause printing of the number 5.

FIGURE 7 shows a similar chart 80 comprised of chart portions 81 through 83. The chart portion 83 shows the arrangement of the characters (sixty-one in all, including punctuation symbols, and the like) around the type-wheel assembly. The characters are arranged in four rows and sixteen columns. Selection of any one column is performed by selecting one of the code groups shown in chart portion 81. Selection of any of the rows is performed by selecting any one of the codes shown in chart portion 82. For example, let it be assumed that the letter P is to be printed. The first code group must then be Space-Space-Space-Space (i.e., binary 0 0 0 0) to select the left-handmost column. In order to select the appropriate row, the code portion employed as shown by chart 82 is Mark-Space-Mark-Mark (i.e., binary 1 0 1 1).

Figure 1:
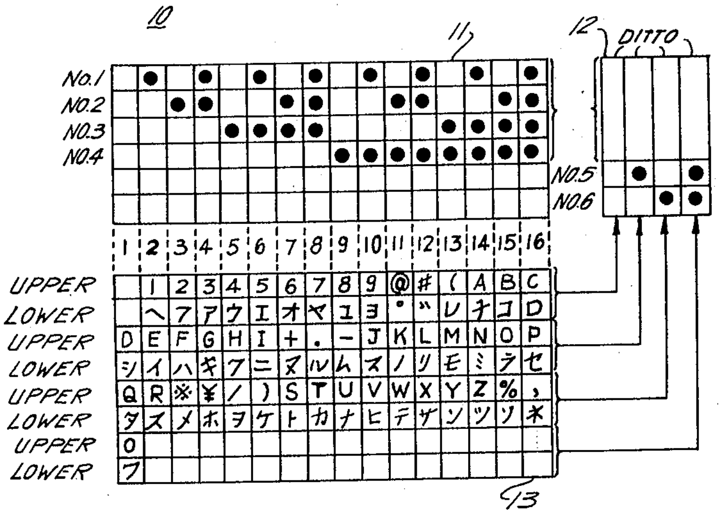
FIGURE 1 is a chart illustrating one coding arrangement which may be employed to drive a typing-receiver system having a two-shift six-bit code arrangement capable of accommodating ninety-six characters.
Figure 2:
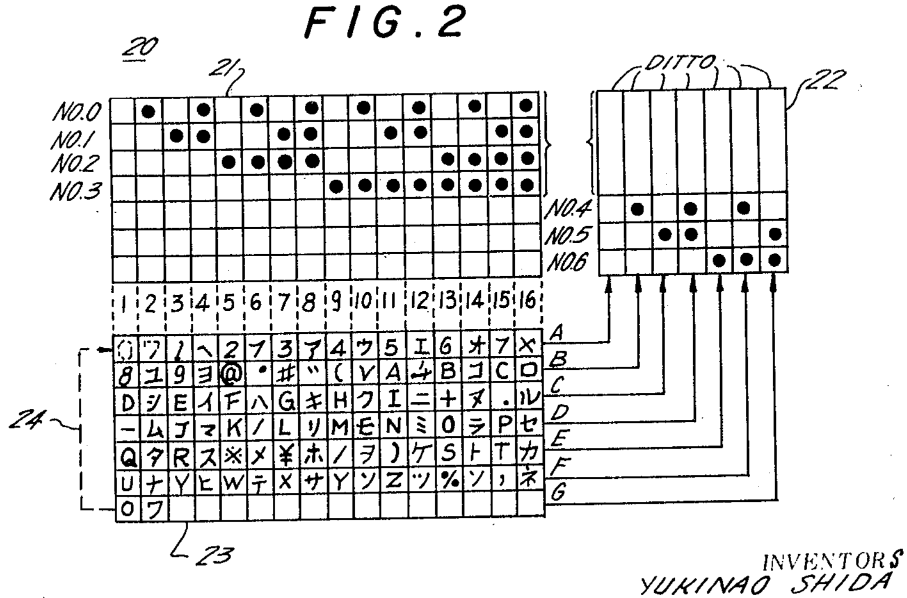
FIGURE 2 is a chart illustrating a modified coding arrangement having an equivalent capacity to that shown in FIGURE 1 of providing more automatic control over the system.

Considering now FIGURE 1, the chart of the figure represents an arrangement commonly referred to as a two-shift six-bit code assignment which includes a shift between upper and lower characters, and FIGURE 2 is a chart showing an equivalent code assignment which may be used in the instant invention which has an additional code level or line designated "No. 0," and which is comprised of one Marking or Spacing bit (i.e., binary ONE or binary ZERO bit, respectively) which is identified respectively by a black circle or a blank square, and which is provided for each vertical row of characters on the type-wheel in order to assume the function of a shift code for the purpose of distinguishing between upper level and lower level characters.

Considering first FIGURE 1, the chart 10 may be divided into three portions 11, 12 and 13 in order to simplify the consideration and interpretation of the chart. Chart portion 11 indicates the coded representations of a four-bit Mark-Space (or binary ONE-binary ZERO) code in order to identify any one of sixteen columns of characters, as shown in chart portion 13. Each black circle indicates a binary ONE or Mark bit state, and each blank square indicates the presence of a binary ZERO or Space bit. In a four-bit binary or Mark-Space code there is a maximum of sixteen combinations of the bits. For example, if the code Mark-Mark-Mark-Mark (or 1 1 1 1 in binary code parlance) is received, the type-wheel (to be more fully described subsequently) will be rotated so that the right-handmost column of chart portion 13 will confront the platen for the purpose of printing one of the characters arranged in this right-handmost column. Obviously, any other one of the possible code combinations in chart portion 11 will cause the type-whel to be rotated so that the associated column for that particular code combination will confront the platen in a similar manner.

Once the angular orientation of the type-wheel has been selected, it then becomes necessary to select the particular level or row of the type-wheel for the selected column which contains the character to be printed. In order to select the appropriate level, two additional bits of Mark-Space or binary information are added to each code group identified by the rows numbered 5 and 6. For example, with the column arbitrarily numbered from the left-hand end toward the right-hand end 1 through 16, respectively, let it be assumed that it is desried to confront the platen with column 10 (which contains the English language symbols 9, J, V) and likewise which contains three symbols of the Japanese language ヨ, ス, セ. Let it be assumed that it is desired to select the English letter J. Then the code bits of rows numbered 5 and 6, namely the code bits Mark-Space will be added to the code bits of column 10 to form a composite six-bit code group of Mark-Space-Space-Mark-Mark-Space (or, in binary parlance, 1 0 0 1 1 0). This will drive the type-wheel assembly in its axial direction so as to select either one of the characters J or ス. It should be noted that each of the rows of chart portion 13 contains only characters of a single language. For example, the topmost row contains characters of the English language as well as Arabic numerals and some other symbols, while the second row from the top contains Japanese characters. All of the rows containing the English characters are designated as upper case, while the rows containing Japanese characters are designated as lower case. It, therefore, is necessary for the operator to perform a shift function to select either upper or lower case, once the operator has determined which language the message is to be printed in. Thus, the system employing the code arrangement of FIGURE 1 is partially automatic and partially manual. In order to provide a type-wheel having a capacity of ninety-six characters divided into characters for two separate languages wherein upper case operation causes printing of the characters of one language and lower case operation causes printing of the characters of a second language, it can clearly be seen that a type-wheel assembly accommodating such an arrangement requires eight levels of characters. This imposes a requirement on the type-wheel as being of greater length and greater mass, thereby having a significant effect upon the operating speed of such a type-wheel, since the type-wheel will have to travel over greater distances in order to accommodate eight levels of characters, and since its mass will increase in order to provide eight levels around the type-wheel. For purposes of the instant invention, it should be understood that there are certain code assignments which are normally employed to identify functions to be performed by the mechanism, such as, for example, space, carriage return, and line advance, to name just a few. In all of the charts described in the instant application, the code assignments of such functions are omitted, since it is considered to be unnecessary from the viewpoint of understanding the instant invention.

In order to provide a type-wheel assembly of compact design, smaller size and weight, and capable of performing high speed operation, it is preferable that characters be arranged in a type-wheel having a sixth level design such as is shown in FIGURE 2. In addition to the compact arrangement, as shown in FIGURE 2, it is further important to rearrange the two upper level and lower level characters; that is, the characters "0" and "ワ," which are inserted into appropriate blank spaces in row A of chart portion 23, which shift in position is indicated by the dotted line 24. With this arrangement, the eight levels of chart portion 13 in FIGURE 1 are first reduced to seven levels in chart portion 23 of FIGURE 2, and ultimately reduced to six compact levels in which every column position of each row or level contains a character. Arbitrarily designating the left-handmost to the right-handmost columns of chart portion 23 and 21 as 1 through 16, respectively, a code group somewhat similar to that shown in FIGURE 1 is employed as shown in chart portion 21 for selecting the particular column of characters which are to confront the platen for a printing operation. However, as compared with chart portion 11, the rows of chart portion 21 are designated 0 through 3, wherein row "0" is provided with either a Mark or Space bit (i.e., black circle or blank square, respectively) for each vertical row of characters on the type-wheel with row "0" now assuming the function of a shift code bit for the purpose of distinguishing between upper level and lower level characters. The reason for this is, as can clearly be seen from chart portion 23, that each row A through F no longer contains the characters of one language exclusively, but is now arranged so that alternating characters are of a first language and interspersed characters in the remaining positions are of a second language. Thus, when any one of the columns 1 through 16 on the type-wheel is selected in accordance with the code group of chart section 21, the characters of only one language are automatically selected. This can clearly be seen, for example, by comparing any of the columns 1 through 16 of FIGURE 1 with an associated column of FIGURE 2. Column 16 of FIGURE 1, for example, is made up of both English and Japanese characters, whereas the associated column 16 of FIGURE 2 is made up exclusively of Japanese characters. Comparing associated columns 15, the column of FIGURE 1 is made up of both English and Japanese characters, whereas the associated column of FIGURE 2 is made up exclusively of characters of the English language.

In order to provide the capability of selecting one of the rows A through F, the code groups of chart portion 22 are employed. This code group portion is arranged in rows numbered 4, 5 and 6, as shown by chart portion 22. As one example, let it be assumed that column 9 is to be selected. The code received should then be Space-Space-Space-Mark (i.e., 0 0 0 1 in binary code). Let it now be assumed that the English character H in level C is the character in column 9 to be printed. The level-selecting code group should then be Space-Mark-Space (or 0 1 0 in binary code), making the composite code being received as Space-Space-Space-Mark-Space-Mark-Space. It should clearly be understood that the elongated blank columns above row No. 4 of chart portion 22 are provided to indicate that one of the code groups of chart portion 21 would occupy that space, depending upon the column to be selected, and thus, these blank columns of chart portion 22 have been designated by the word "Ditto." This is also the case in the chart portion 12 of FIGURE 1, and this chart portion should be interpreted in a similar manner.

Obviously, if the same column (i.e., the ninth column) is to be selected, but another character in that column is the one to be printed, for example, the character "Y," the code group representing the ninth column will remain identical; namely, Space-Space-Space-Mark; and the second code group portion will now be Mark-Space-Mark, giving a resultant code of Space-Space-Space-Mark-Mark-Space-Mark (or 0 0 0 1 1 0 1 in binary code).

As can clearly be seen from a consideration of chart portions 22 and 23, a level-selecting code group is provided for the row G which has been transferred to blank positions available in row A. However, a code group must be provided in order to enable selection of either one of these characters. The column designations for these two characters remain the same; i.e., they occupy columns 1 and 2 in each of the same columns after the shift as they occupied before the shift, as designated by dotted line 24. The code group contained in rows 4 through 6 to identify selection of row G is Space-Mark-Mark (or 0 1 1 in binary code). It, therefore, becomes necessary to recognize that selection of level G employing the code Space-Mark-Mark, together with either the column 1 or column 2 selecting code, must immediately be recognized as requiring the type-wheel to be driven to the level identified by row A in chart portion 23. This function, as well as all other level-selecting functions which are to be performed in order to drive the type-wheel assembly, may be carried out effectively through the assembly, as shown in FIGURES 3 through 5, which will now be described.

Figures 3, 4:
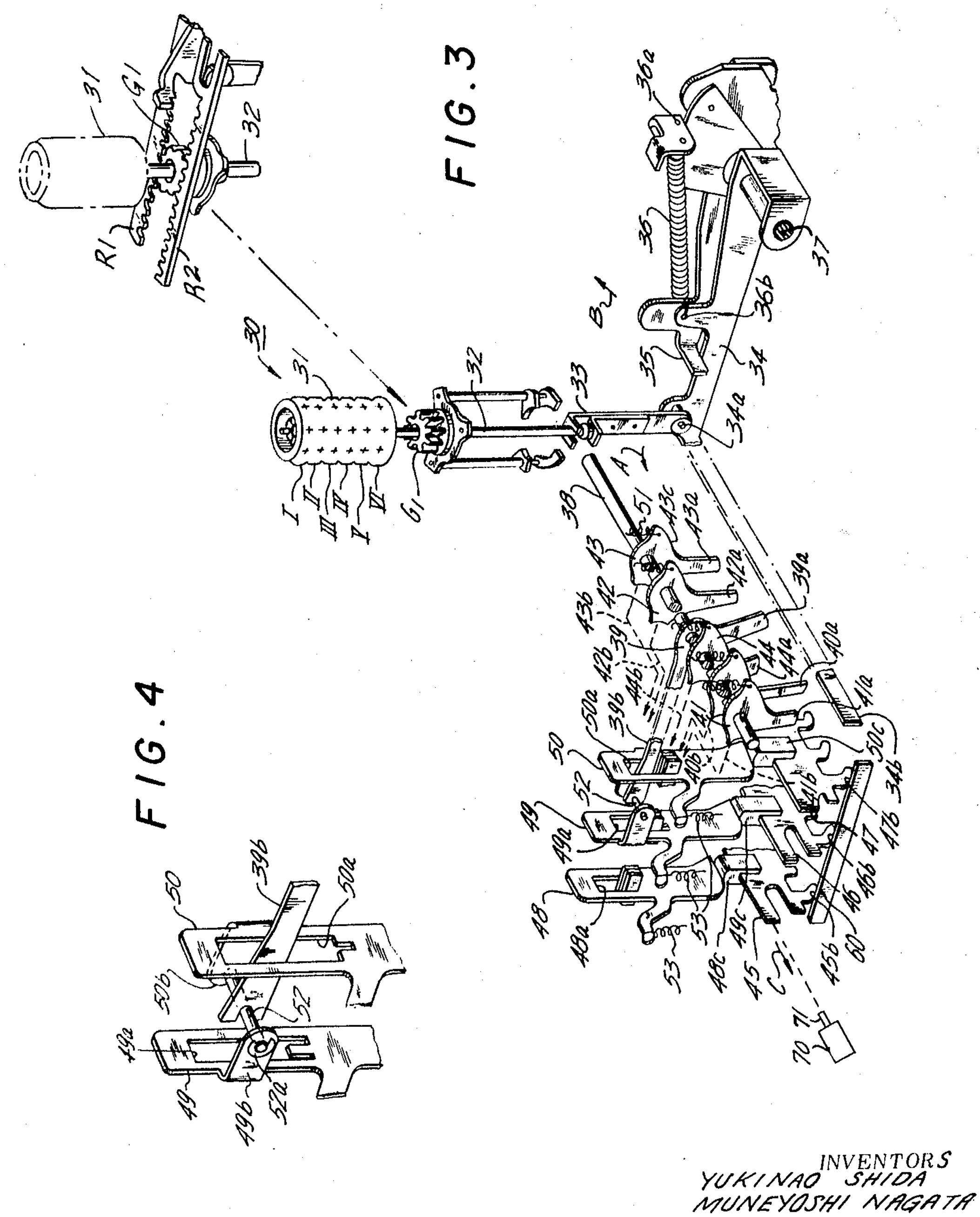
FIGURE 3 shows a fragmentary perspective view of the essential portion of a typing-receiver mechanism for controlling type-wheel travel which embodies the principles of the instant invention.
FIGURE 4 shows an enlarged fragmentary perspective view of the see-saw mechanism of FIGURE 3 in greater detail.

Considering first FIGURE 3, the assembly 30 shown therein is comprised of a substantially cylindrically shaped type-wheel 31 supported by a shaft 32, and accommodating letters, symbols and other characters at six levels or lines, each of which includes a maximum of sixteen characters. The solid line characters arranged in levels A through F in chart portion 23 of FIGURE 2 are arranged in the six lines or levels I through VI, respectively, in substantially the identical pattern as shown in the chart of FIGURE 2. The characters provided in level G of chart portion 23 are arranged on the type-wheel in line I at positions corresponding to the blank squares in which these characters have been inserted at level A of chart portion 23.

The shaft 32 is rockably fulcrumed upon a lever 33 which is pivotally supported by a type-wheel vertical drive lever 34 having a pivot pin **34*a*. The vertical drive lever 34 experiences a rocking motion, as will be more fully described, in order to cause rise and fall of the shaft 32** in the axial direction.

As was described previously, a four-bit code group, as shown in chart portion 21 of FIGURE 2, performs the control functions of rotating the type-wheel mechanism in the appropriate angular position so as to cause one column of characters to confront the typing mechanism platen (not shown). The rotational operation, when performed jointly with the axial movement of the type-wheel assembly, to be more fully described, selects one particular level of the column of character types which is that character to be printed.

The means for driving the type-wheel in the rotational direction may be any conventional means, and the detailed features of the mechanism have been omitted from the drawings and will be omitted from the description for purposes of simplicity, it being understood that any suitable mechanism may be employed which is compatible with the arrangement of the instant invention. For example, the gear G1 of the type-wheel assembly may selectively be meshed with one of the racks $R_1$ or $R_2$ which are linearly moved to rotate shaft 32, and hence the type-wheel 31. When the type-wheel 31 and its shaft 32 move vertically upward under control of the vertical drive means, gear G1 may move vertically upward relative to its engaging rack while, at the same time, remaining meshed therewith so as not to upset the rotational alignment of the type-wheel. Obviously, any other arrangement may be employed.

The lever 33 is pivoted by pin **34*a* to vertical drive lever 34** in order to enable this assembly to move or pivot slightly in the direction shown by arrow A so that the type-wheel may be driven or urged into contact with the platen (not shown) by a hammer (also not shown) in order to print the desired character.

The vertical drive lever 34 is normally biased upwardly by means of a spring 36 which is secured at one end **36*a* to the base of a drive arm 35 and, at its opposite end 36*b*, to a projection provided on vertical drive arm 34. Each time a code signal is received the drive arm 35 pivots upward, as shown by arrow B, about shaft 37 to impose tension upon spring 36 and thereby cause the vertical drive arm 34 to follow drive arm 35 and likewise rotate clockwise, through a fixed angle, about fixed shaft 37 which, in turn, will impart axial movement to shaft 32 and hence type-wheel 31**.

A series of stop levers 39 through 44, respectively, are rotatably mounted upon a second fixed shaft 38 for the purpose of mechanically cooperating with the operating arm **34*b* of the vertical drive lever 34 in order to limit the angle through which lever 34 will travel, and hence to limit the amount of rise which the type-wheel 31 will undergo, and thereby control the selection of the six levels I through VI, respectively. In cases where the code group received orders a functional operation (i.e., carriage return, line skip, etc.) it should be understood that no printing operation takes place even though type-wheel 31** may be lifted vertically upward owing to the restraining action imposed upon the printing mechanism by devices well known in the prior art. It is, therefore, felt that description of such functional operations is best omitted herein for purposes of clarity.

In order to accurately and positively control the limited amount of lift or vertical upward movement which the type-wheel may undergo, the assembly 30 of FIGURE 3 is further provided with three code bars 45, 46 and 47, respectively, which correspond to the three respective bits in the code received which select or designate one of the character levels, and which, in FIGURE 2, appear in lines 4, 5 and 6 in the chart portion 22 of FIGURE 2. Upon the reception of one of the seven possible codes, the code bars 45 through 47 each either rise or remain at rest in accordance with the state of the particular bit being received, as shown by rows No. 4, 5 and 6, as being either a Mark or Space bit, respectively. The code bars may each be driven by solenoids 70 (only one being shown in FIGURE 3) which each convert the code signal into physical movement. As one example, a plurality of guides, only one of which is shown, designated by the numeral 60, may be provided in the mechanism. Each of these guides may be arranged to cooperate with the inclined edges **45*b* through 47*b* provided along the underside of code bars 45 through 47, respectively. In the case where none of the three code bars receive a Mark bit (i.e., where all three receive a Space bit) all three code bars will remain at rest. However, let it be assumed that code bar 45 receives a Mark bit. Then a mechanism such as solenoid 70 will drive code bar 45 in the direction shown by arrow C, by pulling its solenoid armature 71 in direction C, causing each of its inclined edges, only one of which 45*b* is shown in FIGURE 3, to ride up upon the guide bar 60**, and hence experience a vertically upward movement. Obviously, any one of the two remaining code bars may be operated in a similar fashion.

Three slide members 48, 49 and 50 are provided to rise and fall in cooperation with their associated code bars 45 through 47, respectively, in order to rock the stop levers in different combinations of rotational movement in accordance with the manner in which the code bars 45–47 are selectively raised. This movement is controlled by means of blocks **48*c*–50*c* positioned above each of the code bars 45–47, respectively, and which are rigidly secured to the slides 48–50, respectively, each having slots 48*d*–50*d* which receive and guide the upper edges of an associated code bar 45–47**, respectively.

Each of the slides have formed therein vertical slots **48*a*–50*a*, respectively, which can best be seen in FIGURES 3 and 4, each of the slots having differing profiles, as will more fully be described. Two of the slides 49 and 50, which cooperate with the code bars 46 and 47, respectively, and correspond to the second and third of the three-bit level selection code, i.e., the bits arranged in rows No. 5 and No. 6 of chart portion 22, are provided with projecting lugs 49*b* and 50*b*, as shown best in FIGURE 4, which are arranged on opposite sides of their respective slide members so as to project toward one another, and hence support a see-saw bar 52 coupled thereto by suitable fastening means 52*a*, for example. The function of the see-saw bar will be more fully described subsequently. Each of the slide members are biased normally in a vertically downward direction by means of the springs 53** whose top ends are coupled to an extending arm provided on each slide member, and whose bottom ends are coupled to any suitable stationary support (not shown) within the typing-receiver mechanism.

Each of the stop levers 39 through 44 have respective blocking arm portions **39*a* through 44*a* which are arranged to be selectively positioned within the path of movement of operating arm 34*a* provided on the type-wheel vertical drive lever 34, and are further respectively provided with control arm portions 39*b* through 44*b*, which are operable and move under control of the set of slides 48 through 50**.

All of the stop levers, with the exception of stop lever 39, are normally biased counterclockwise about fixed shaft 38 by separate spring means 51, the lower end of each spring means being anchored to a portion of each arm, and the upper end of each spring means being coupled to a stationary support (not shown) provided within the typing-receiver mechanism.

The control arm portions **40*b* through 44*b*, which have been shown in fragmentary fashion for the purposes of simplicity, are bent at predetermined portions along their lengths, as shown by the dotted line sections, so that each of the control arms 40*b* through 44*b* are compactly arranged and further extend through at least one of the slots 48*a* through 50*a* provided in the slides 48 through 50**, respectively.

Each of the slots **48*a* through 50*a* has a portion of its bottom edge notched in a stepwise fashion in order to engage and receive therein a selected one, or selected ones, of the control arms 40*b* through 44*b*, respectively, which are biased vertically downward by separate spring means 51**, previously described.

The lugs **49*b* and 50*b* previously described and provided on slides 49 and 50, respectively, serve to freely support the respective ends of a see-saw bar 52, as can best be seen in FIGURE 4. The extreme end portion of the control arm 39*b* of stop lever 39 is notched so as to receive see-saw bar 52 and be supported by it. Lever 39*b* is positioned intermediate the ends of bar 52 in order to experience rocking and turning movements relative thereto, the turning movement occurring as a result of either one of the slide members 49 or 50 being lifted, while the remaining one remains in its normal downward position, while the rocking motion is experience by both of the slide members 49 and 50 being lifted simultaneously. The main or blocking arm portion 39*a* of stop lever 39 is normally in the inoperative position as a result of the spring biasing means 51, which inoperative position can be best seen in FIGURE 5. FIGURE 5 shows a stationary support element S which may be employed to anchor the upper end of each of the spring means 51 (only one of which is shown in FIGURE 5). Upon receipt of a code combination in which the code elements in rows No. 5 and No. 6 of chart portion 22 are both Mark bits (i.e., both binary ONE bits), code bars 46 and 47 will move in the direction shown by arrow C so as to lift these code bars up upon the guide bar 60 and hence lift the slide members 49 and 50 vertically upward in order to rock or rotate stop lever 39 counterclockwise about the stationary shaft 38, causing its blocking arm portion 39*a* to move into the operative position to abut operating arm 34*a* of the vertical drive lever 34, and hence limit its upward vertical movement to make it possible to selectively print the characters which, in the dark portion 22 of the code assignment of FIGURE 2, have been removed from the row G and placed in unoccupied locations in the row A. The counterclockwise movement of stop lever 39 causes it to move from the solid line position of FIGURE 5 to the position shown by the stop lever portion 40*a*, which can clearly be seen will operate to block arm 34*a* from any movement after it has moved through a distance D represented by the gap between the top edge of operating lever 34*a* and the bottom edge of blocking lever 40*a***.

In the preferred embodiment of the instant invention, the character types corresponding to the letters or symbols previously arranged in row G of chart portion 23, which are now arranged in the top level I of the type-wheel as described hereinabove, the blocking arm portion **39*a* of stop lever 39 has a length substantially equal to that of the blocking arm portion 40*a* of stop lever 40 which is normally provided to select the type-wheel line I corresponding to the row A of chart portion 23**.

As shown in FIGURE 5, the blocking arm portions **40*a* through 44*a* of stop levers 40 through 44, respectively, each have lengths differing from one another. The stop lever 43 is provided with an additional abutting arm portion 43*c* which is shorter than any of the abutting arm portions 40*a* through 44*a*. The abutting or blocking arms 40*a* through 44*a* are normally held in the operative position, or solid line position, as shown in FIGURE 5, which position is that immediately above the operating arm 34*b* of the vertical drive lever 34. The abutting or blocking arm portion 43*c* is normally held in the inoperative position, i.e., out of the path of movement of the operating arm 34*b*. In order to enable the type-wheel 31 to move to any one of six different vertical levels in order to selectively print one of the six lines of characters I through VI, the operating arm 34***b* of the vertical drive lever 34 must be selectively placed in engagement with the respective abutting edges (i.e., the lower edges) of the blocking levers 40*a* through 44*a* and 43*c*, respectively. To this end, it is necessary that the stop levers 40 through 44 be selectively rocked by means of the slide members 48 through 50 which are vertically movable, or which remain at rest in accordance with whether the level control bits received are either Mark or Space bits, respectively. In order to move any or all of the blocking lever portions, which are not to be selected, out of the path of movement of the operating arm 34*b*, the slots 48*a* through 50*a* are notched at their bottom edges in a pattern such that the control arms 40*b* through 44*b*, respectively, are held in engagement with the bottom edge of the slot in the respective slide or slide combinations to be described below. One exception is for the case of blocking lever portion 39*a* whose control arm portion 39*b* does not rest in a notch, but is coupled to see-saw bar 52.

Control arm portions 40*b*, 41*b* and 42*b* each have lengths so as to extend through all three slots provided in the slide members 48 through 50.

Considering first the control arm 40*b* of stop lever 40, this arm extends through the slots of all three slide members 48 through 50 and is aligned so that its lower edge does not fall into any of the notches formed in the slots of the slide members, and therefore so that its lower edge bears against the lower horizontal edge of each slotted member. Thus, when any one of the slides 48 through 50, or all of them, move vertically upward, control arm 40*b* will be moved vertically upward. This arrangement can best be seen from FIGURE 5*a* which shows the forwardmost portions 40*b* through 44*b* of the control levers and which further shows the lower profiles 48*a* through 50*a* in exploded fashion in order to clarify the manner of operation of the notched slots in the slides and the control arms.

Continuing with the remainder of the control arms, it can be seen that slot 48*a* is provided with the notch 60, slot 49*a* is provided with a pair of notches 61 and 62, and the slot 50*a* is provided with the notch 63. Control arms 40*b*, 41*b*, 42*b* and 44*b* all extend through all three slots 48*a* through 50*a*, which control arm 43*b* extends only through slots 49*a* and 50*a*. FIGURE 5*b* contains a chart showing levels to be selected I through VII, the code representing each level (in binary form) and the control levers lifted as a result of the particular binary code present.

Considering each of the possible binary codes, the lifting operation will now be described:

Let it be assumed that level I is to be selected. The code present is then 0 0 0, causing none of the code bars 45 through 47 to experience any movement so that all three slides 48 through 50 remain in their downward rest position. Thus, none of the control arms 40*b* through 44*b*, as well as control arm 39*a*, are lifted. This places the lower edge of blocking arm 40*a* in the path of movement of operating arm 34*b* of the vertical drive lever allowing the vertical drive lever to lift by only a small distance D in order to select level I.

Let it now be assumed that level II is to be selected. The code present is 1 0 0, which causes only code bar 45 to be moved in the direction shown by arrow C, thus lifting only slide member 48. This causes all of the control arms 40*b*, 42*b* and 44*b* to be lifted. However, the notch 60 provided in slide 48, will not raise control arm 41*b* which bears against the edges of slots in slides 49 and 50, and which is received in the notch 60 having a depth which is insufficient to lift control arm 41*b*. The lifting of control arm 40*b* causes its blocking arm 40*a* to be moved to the unoperative position, thereby placing the lower edge of blocking lever 41*a* in the path of operating arm 34*b*, allowing it to move a distance positioned to place level II in the typing position. Even though control arms 42*b* and 44*b* may be lifted upwardly with control arm 40*b*, the movement of their blocking levers 42*a* and 44*a* is immaterial, since it is only necessary that the blocking lever 41*a* be in the blocking position at this time.

Let it now be assumed that level III is desired to be selected. The code at this time is 0 1 0, causing only code bar 46 to move in the direction shown by arrow C, lifting only slide member 49 upward from its rest position. It can be seen that the lifting of slide 49 lifts the control arms 40*b*, 41*b* and 44*b* whose lower edges rest against the lower edge of the slot 49*a*. However, the notches 61 and 62 provided in slot 49*a* prevent the lifting of control arms 42*b* and 43*b*. Thus blocking levers 40*a* and 41*a* move to the inoperative position, placing the lower edge of blocking lever 42*a* in the path of movement of the operating arm 34*b* to allow level III to be selected. The movement of control arm 44 upward is immaterial, since its associated blocking lever 44*a* in no way affects the limiting movement of operating arm 34*b*.

Let it now be assumed that level IV is to be selected. This is represented by the code 1 1 0, which ultimately causes slides 48 and 49 to move vertically upward from their rest position. This causes control levers 40*b*, 41*b*, 42*b* and 44*b* to be lifted upwardly, moving their associated blocking levers out of the operative position. The notch 62 provided in slot 49*a* prevents the control arm 43*b* from being lifted. Although the notch 61 in slot 49*a* prevents control arm 42*b* from being lifted, the engagement of control arm 42*b* with slot 48*a* lifts this control arm. Thus, its blocking lever 43*a* remains in the operative position to limit the upward vertical movement of operating arm 34*b* so as to select level IV to be the level in the printing or typing position.

Let it now be assumed that level V is to be selected. The code at this time is 0 0 1, causing ultimately only slide 50 to move vertically upward from its rest position. Slide 50 engages and moves vertically upward the control arms 40*b* through 43*b*, causing their associated blocking levers 40*a* through 43*a*, respectively, to be moved into the inoperative position. However, the notch 63 provided in slide 50*a* prevents the lifting of control lever 44*b*, causing its blocking lever 44*a* to remain in the operative position so as to limit the path of vertical upward movement of operating arm 34*b* in order to select level V.

In order to select level VI, the code generated at such time is 1 0 1, causing the slides 48 and 50 to move vertically upward from their rest positions. As was previously described, slot 50 lifts all of the control arms 40*b* through 43*b*, respectively. Slide 48 lifts control arms 40*b*, 42*b* (which are already lifted) and control arm 44*b* so that all control arms are lifted at this time. This moves their associated blocking levers 40*a* through 44*a* into the inoperative position. The movement of blocking lever 43*a* to the inoperative position moves its shoulder 43*c* to the operative position in order to select level VI.

In order to select VII level, the code at this time is 0 1 1, causing only the slides 49 and 50 to move vertically upward from their rest positions. The lifting of slide 50 lifts the control arms 40*b* through 43*b* in the same manner as was previously described. The lifting of slide 49 lifts control arms 40*b*, 41*b* (which have already been lifted by slide 50) and 44*b* so as to cause the shoulder 43*c* of blocking lever 43*a* to be the only blocking lever in the blocking or operative position with respect to operating arm 34*b*. It should, however, be noted that the lifting of slides 49 and 50 (note especially FIGURE 4) cause the lifting of both ends of see-saw bar 52 which, in turn, causes the lifting of control lever 39*b* so as to move its associated blocking lever 39*a* from the normal inoperative position to the operative or blocking position. Thus, even though all blocking levers 40*a* through 44*a* have been moved to the inoperative position, operating arm 34*b* is nevertheless confronted with the blocking lever 39*a* which is now in its path of movement, causing the type-wheel to again be limited to rising level I. It can, therefore, be seen that two distinctive codes are each capable of selecting level I.

In the selection of any of the levels IV, V or VI, which cause either one of the slides 49 or 50 to rise from their rest positions, only one of the two projections 49*b* or 50*b* (note especially FIGURE 4) are lifted so that the rod 52 operates in a see-saw fashion, and its lifting operation from either one end or the other is insufficient to move blocking lever 39*a* into the operative position. Thus, both slides 49 and 50 must be lifted in order to move blocking lever 39*a* into the operative or blocking position to limit the travel of operating arm 34*b*.

Whereas one preferred arrangement for the control arms and notches provided in the slots has been given herein, it should be understood that a variety of other combinations may be employed for the purpose of selecting the levels I through VI. Obviously, if the code combinations are altered, suitable alterations in the notches and the length of the control arms may be made to accommodate them. For example, if the code Space-Mark-Mark (i.e., binary 0 1 1) is employed to identify level II in place of the code Mark-Space-Space (i.e., 1 0 0) and other similar changes, i.e., a reversal of the code combination, are made, then changes in the notches and control arm lengths may likewise be made to accommodate a different coding combination.

It can, therefore, be seen from the foregoing that the instant invention provides a novel type-wheel and type-wheel drive assembly in which the type-wheel is very compactly arranged and yet has a capacity of ninety-six characters and further provides a drive assembly which very swiftly and positively selects the particular level of the character to be typed, while keeping the overall length of the type-wheel to a minimum in order to reduce its size and mass and enable it to rapidly move to the selected position. The type-wheel drive assembly automatically selects any one of the six normal levels found in conventional type-wheel arrangements, and further provides means for automatically selecting the level in which characters of a seventh level, when conventional arrangements are employed, which have been reassigned to one of the remaining six levels. For example, if any of the levels from II through VI were selected as the level in which the characters normally found in the seventh level were to be insertetd, this selection can simply and easily be made by adjusting the length of blocking lever 39*a*.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

What is claimed is:

1. A type-wheel and type-wheel drive assembly for use in typing-receiver systems and the like comprising a type-wheel of substantially cylindrical configuration and having a plurality of rows of characters arranged at different levels around the type-wheel surface; each level having substantially the same number of characters;

said drive assembly comprising a drive arm coupled to said type-wheel for axially moving said type-wheel from a rest position to a displaced position in readiness for a typing operation;

drive means for moving said drive arm to impart axial movement to said type-wheel;

said drive arm having an operating arm extending transverse to the axis of said type-wheel;

a plurality of pivotally mounted blocking levers normally held in an operative position so that their lower edges are in the path of movement of said operating arm;

said blocking levers each being of differing lengths and each having an associated control arm coupled thereto for rocking its associated blocking lever under control of said rocking means;

means responsive to control codes for rocking selected ones of said blocking levers out of said operative position under control of differing code combinations to limit the amount of movement of said type-wheel in accordance with the longest blocking lever remaining in the path of movement of said operating arm;

a plurality of slides mounted for reciprocal movement between a rest and a rocking position and each having an elongated slot, said slots being substantially in alignment with one another;

all of said control arms extending through at least one of said slots to be lifted by said slides;

selected ones of said slides being notched along the lower edges of their slots to prevent those control levers positioned above the notches from being rocked when said slides are moved to the rocking position.

2. The device of claim 1 further comprising bias means for normally urging said slides toward the rest position;

a plurality of slidably mounted code bars each associated with one of said slides and normally being held in a rest position; means for driving said code bars in a first direction to drive its associated slide toward the rocking position.

3. The device of claim 2 wherein each of said code bars has a first edge thereof positioned to engage an edge of its associated slide; and having at least one inclined edge opposites its first edge; a stationary bar arranged transverse to said code bars and engageable with the inclined edges of all of said code bars to drive said code bars in a direction at right angles to said first direction.

4. The device of claim 3 wherein said type-wheel is provided with six rows of characters requiring a code group of three-bit binary length to select the desired level;

said type-wheel drive assembly being comprised of a code bar and slide for each bit of said level selecting code.

5. The device of claim 3 wherein the means for driving said code bars is comprised of means for converting the coded signals into mechanical movement to slide said code bars.

6. The device of claim 5 wherein said driving means is comprised of solenoid means each receiving a signal of the code signal group and having a reciprocally mounted armature coupled to an associated code bar.

7. A type-wheel and type-wheel drive assembly for use in typing-receiver systems and the like comprising a type-wheel of substantially cylindrical configuration and having a plurality of rows of characters arranged at different levels around the type-wheel surface; each level having substantially the same number of characters;

said drive assembly comprising a drive arm coupled to said type-wheel for axially moving said type-wheel from a rest position to a displaced position in readiness for a typing operation;

drive means for moving said drive arm to impart axial movement to said type-wheel;

said drive arm having an operating arm extending transverse to the axis of said type-wheel;

a plurality of pivotally mounted blocking levers normally held in an operative position so that their lower edges are in the path of movement of said operating arm;

said blocking levers each being of differing lengths;

means responsive to control codes for rocking selected ones of said blocking levers out of said operative position under control of differing code combinations to limit the amount of movement of said type-wheel in accordance with the longest blocking lever remaining in the path of movement of said operating arm;

at least one pivotally mounted additional blocking lever normally biased to occupy an operative position out of the path of movement of said operating arm;

means coupled to at least two of said slides for driving said additional blocking lever to the operative position only when both of said two slides are simultaneously driven to the rocking position.

8. The device of claim 7 wherein said means for driving said additional blocking lever is comprised of a see-saw bar;

projections on opposite sides of each of said two slides being bent toward one another for supporting the ends of said see-saw bar;

an additional control lever rigidly coupled to said additional blocking lever and having a slot at its free end for receiving and being supported by said see-saw bar; said additional control lever being supported by said see-saw bar at a point substantially midway from its ends to lift said additional control bar only when said two slides are simultaneously moved to their rocking position.

9. A type-wheel and type-wheel drive assembly for use in typing-receiver systems and the like comprising a type-wheel of substantially cylindrical configuration and having a plurality of rows of characters arranged at different levels around the type-wheel surface; each level having substantially the same number of characters;

said drive assembly comprising a drive arm coupled to said type-wheel for axially moving said type-wheel from a rest position to a displaced position in readiness for a typing operation;

drive means for moving said drive arm to impart axial movement to said type-wheel;

said drive arm having an operating arm extending transverse to the axis of said type-wheel;

a plurality of pivotally mounted blocking levers normally held in an operative position so that their lower edges are in the path of movement of said operating arm;

said blocking levers each being of differing lengths;

means responsive to control codes for rocking selected ones of said blocking levers out of said operative position under control of differing code combinations to limit the amount of movement of said type-wheel in accordance with the longest blocking lever remaining in the path of movement of said operating arm;

a substantially cylindrical member having six rows of characters arranged at different levels around said type-wheel and each having an equal number of characters per row to provide for a total capacity of ninety-six characters and/or symbols arranged in an array comprised of six rows in sixteen columns;

a first portion of said characters being of a first language;

a second portion of said characters being of a second language;

each row having characters of said first and second languages interspersed in alternating fashion in each row;

the odd columns of said array having characters of only one of said languages, the even columns of said array having characters of only the remaining one of said languages, there being a total of eight rows with at least three of said rows having some unoccupied position;

said characters being rearranged in six filled rows relative to conventional type wheels in which eight rows are provided, alternate rows having characters of one of said languages, the remaining rows having characters of the remaining one of said languages, and two of said rows having unoccupied positions;

said control code being a code of three-bit binary length with a different code combination of said three-bit code assigned to each of the above mentioned eight rows;

six of said codes being assigned to select the six levels of said type-wheel;

additional means under control of said code combinations assigned to the two rows of the eight-row array consolidated with one of the six remaining rows to select a row with which the characters of the omitted row have been combined.

10. In a teletypewriter or other motor-operated typewriter of the type employing a type-wheel adapted for both rotation and axial vertical movement for selective printing in accordance with a control code having bits of either Mark or Space states, a typing-receiver mechanism in which said type-wheel accommodates characters arranged at six levels around the type-wheel and having sixteen characters in each level, and which further comprises:

three code bars corresponding to three respective code bits provided in the code for selection of the character levels and each operable to rise when the corresponding one of said three bits in the code combination received is marking;

three slide members each having vertically aligned slots of respective profiles and vertically movable under control of said respective code bars;

a drive arm for driving the type-wheel in the axial direction, said drive arm having an operating arm extending transverse to said type-wheel;

a set of stop levers each having an abutting arm placeable in operative position to engage the type-wheel vertical drive lever operating arm to limit the amount of movement of the type-wheel; a control arm having a stop lever and being operably associated with said slide members for rocking its associated stop lever from the inoperative position to the operative position when the associated slide members are raised to raise said control arm;

a see-saw bar supported at its opposite ends by the two adjacent ones of said slide members corresponding to two of said three code bits; one of said stop levers having its control arm supported at the end thereof by said see-saw bar intermediate its ends and being thus rockable by the simultaneous rise of the two slide bars supporting the see-saw bar to move the abutting arm of the same stop lever into operative position limiting the amount of rise imparted to the type-wheel by a predetermined amount for the selective printing of certain ones of the letters or symbols assigned to the first line of characters, the remaining stop levers each having its control arm held in engagement with the bottom edge of a slot in one or more of said slide members so as to be rocked as the associated slide members are selectively raised according to the Marking or Spacing state of said three code bits; selected ones of said slots being notched at predetermined positions along their bottom edges to be unable to lift selected ones of said control levels so as to move at least the unwanted blocking levels to the inoperative position in order to accurately control the amount of movement of the type-wheel.

References Cited

UNITED STATES PATENTS

| | | | |
|---|---|---|---|
| 3,382,963 | 5/1968 | Cralle et al. | 197—16 |
| 1,052,356 | 2/1913 | Marchthal | 197—49 |
| 2,080,966 | 5/1937 | Griffith | 197—50 XR |
| 2,892,031 | 6/1959 | Arko et al. | 197—49 XR |
| 3,295,652 | 1/1967 | Sasaki | 197—50 XR |
| 3,334,721 | 8/1967 | Hickerson | 197—49 XR |

EDGAR S. BURR, Primary Examiner

U.S. Cl. X.R.

178—34; 197—18